United States Patent [19]

Kawashima

[11] 3,997,174
[45] Dec. 14, 1976

[54] TURNTABLE MAT
[75] Inventor: Isao Kawashima, Yachiyo, Japan
[73] Assignee: Sony Corporation, Tokyo, Japan
[22] Filed: Mar. 31, 1975
[21] Appl. No.: 563,385
[30] Foreign Application Priority Data
Apr. 4, 1974  Japan .............................. 49-38332
[52] U.S. Cl. .............................. 274/39 R; 248/350;
248/358 R
[51] Int. Cl.² ...................... G11B 3/60; F16F 15/04
[58] Field of Search ....... 274/39 R; 248/350, 358 R
[56] References Cited
UNITED STATES PATENTS
1,446,289    2/1923    Dessau .............................. 274/39 R
3,591,122    7/1971    Mehaffie .......................... 248/350

Primary Examiner—Steven L. Stephan
Attorney, Agent, or Firm—Lewis H. Eslinger; Alvin Sinderbrand

[57] ABSTRACT

A mat for a phonograph record turntable is made up of at least one rubber or other flexible enclosure defining at least one sealed interior space which contains a fluid material, preferably in the form of a viscous liquid, so as to provide a cushioned, vibration-damping record supporting surface which conforms to the shape of a warped or otherwise distorted phonograph record placed thereon. In order to avoid the accumulation of the liquid at any one portion of the mat when the turntable is not horizontally disposed, the interior of the mat may be divided into a plurality of liquid-containing spaces which are isolated from each other, as by partitions therebetween, and/or each interior space may further contain absorbent material which takes up the viscous liquid. The vibration-damping properties of the mat may be enhanced by providing solid particles which float in the viscous liquid.

16 Claims, 6 Drawing Figures

TURNTABLE MAT

BACKGROUND OF THE INVENTION

1. Field of the Invention

This invention relates generally to turntable mats, and more particularly is directed to improved turntable mats for phonograph record players.

2. Description of the Prior Art

Phonograph pickup cartridges are being continuously improved by being made lighter in weight and capable of playing or reproducing phonograph records with continuously decreased vertical contact pressures of the stylus in the record groove. For example, cartridges are presently available that can play phonograph records quite well with a vertical contact force of only one-half gram, and it is anticipated that, in the near future, cartridges will be available to play phonograph records with a vertical contact force of only about one-tenth gram. When using such cartridges, it is important that some means be provided to permit the playing of phonograph records that are not perfectly flat, that is, records that are warped or distorted from a flat plane. Since phonograph records are made of plastic materials which deform under continuous stress and exposure to elevated temperatures, such phonograph records may become distorted or warped either by reason of improper manufacture or because they are not stored under ideal conditions. When a warped or distorted phonograph record is placed on an existing turntable, the undersurface of the record does not contact the surface of the turntable over its entire area so that gaps or spaces are left between the record and turntable with the result that the record is at least partly in a floating or unstable condition. During reproduction of the signals of such a distorted or warped record, the needle or stylus of the cartridge tracks the record groove and considerable forces are generated which react on the phonograph record. Due to the unstable floating condition of the warped record, such forces are apt to produce vertical vibration of the record at a resonance frequency of the latter. Accordingly, the frequency characteristics of the reproduced signal are disturbed, particularly in the vicinity of such resonance frequency, and such disturbance of the frequency characteristics cannot be corrected or removed even though the remainder of the sound reproducing system, such as, the turntable, pickup arm, amplifier and speakers may be components of high quality. The foregoing problems are particularly disturbing in the case of the reproduction of stereo records in which vertical vibrations of the stylus are intended to correspond to right-left difference signals. By reason of the vertical vibrations of a warped or distorted record at its resonance frequency, sounds which originated at the center are displaced toward the right and left in the reproduced stereophonic sounds so that the stereophonic effect is distorted.

Although conventional phonograph record turntables are usually provided with a rubber mat having concentric cicular grooves or ridges on its upper surface, such rubber mats are obviously not adapted to ensure uniform supporting contact with the undersurface of a record over the entire area of the latter when the record is substantially warped or distorted. Further, although the existing rubber mats on phonograph record turntables are intended to absorb vibrations transmitted to the turntable, for example, by the drive assembly for the latter, such rubber mats do not fully absorb the vibrations which are transmitted to the record and then picked up by the cartridge which thereby reproduce corresponding noise signals.

OBJECTS AND SUMMARY OF THE INVENTION

Accordingly, it is an object of this invention to provide a mat for a phonograph record turntable by which a phonograph record supported on the mat is restrained from vibrating so that signals recorded on the record can be very accurately reproduced without distortion even though the record is warped and reproduction is effected with a cartridge having a very low contact pressure thereagainst.

Another object is to provide a mat for a phonograph record turntable which is capable of close supporting contact with a phonograph record even though the latter is substantially warped or deformed from a flat plane.

A further object is to provide a mat for a phonograph record turntable, as aforesaid, which is effective to damp vibrations generated by a drive source for the turntable or resulting from external shocks or impacts to which the turntable or its supporting cabinet may be subjected, so that such vibrations are not transmitted to a phonograph record supported on the mat and reslting noises included in the reproduced signals are avoided.

In accordance with an aspect of this invention, a mat for a phonograph record turntable is made up of at least one rubber or other flexible enclosure enclosing one or more sealed interior spaces each of which contains a fluid material, preferably in the form of a viscous liquid, so as to provide a cushioned, vibration-damping record supporting surface which conforms closely to the undersurface of a phonograph record placed on the mat even though the record is warped or otherwise distorted.

In order to enhance the vibration-damping properties of the mat, each sealed interior space thereof may further contain solid particles which float in the viscous liquid so that the frictional resistance to movement of the viscous liquid relative to the particles floating therein is effective to further damp the transmission of vibrations from the turntable through the mat to a phonograph record supported thereon.

It is a further feature of this invention to avoid the accumulation of the viscous liquid at any one portion of the mat when the turntable is not horizontally disposed either by dividing the inerior of the mat into a plurality of liquid-containing spaces which are isolated from each other, as by partitions therebetween, and/or by including in each interior space an absorbent material which takes up the viscous liquid.

The above, and other objects, features and advantages of the invention, will be apparent in the following detailed description of illustrative embodiments thereof which is to be read in connection with the accompanying drawings.

DESCRIPTION OF PREFERRED EMBODIMENTS

Figure 1:
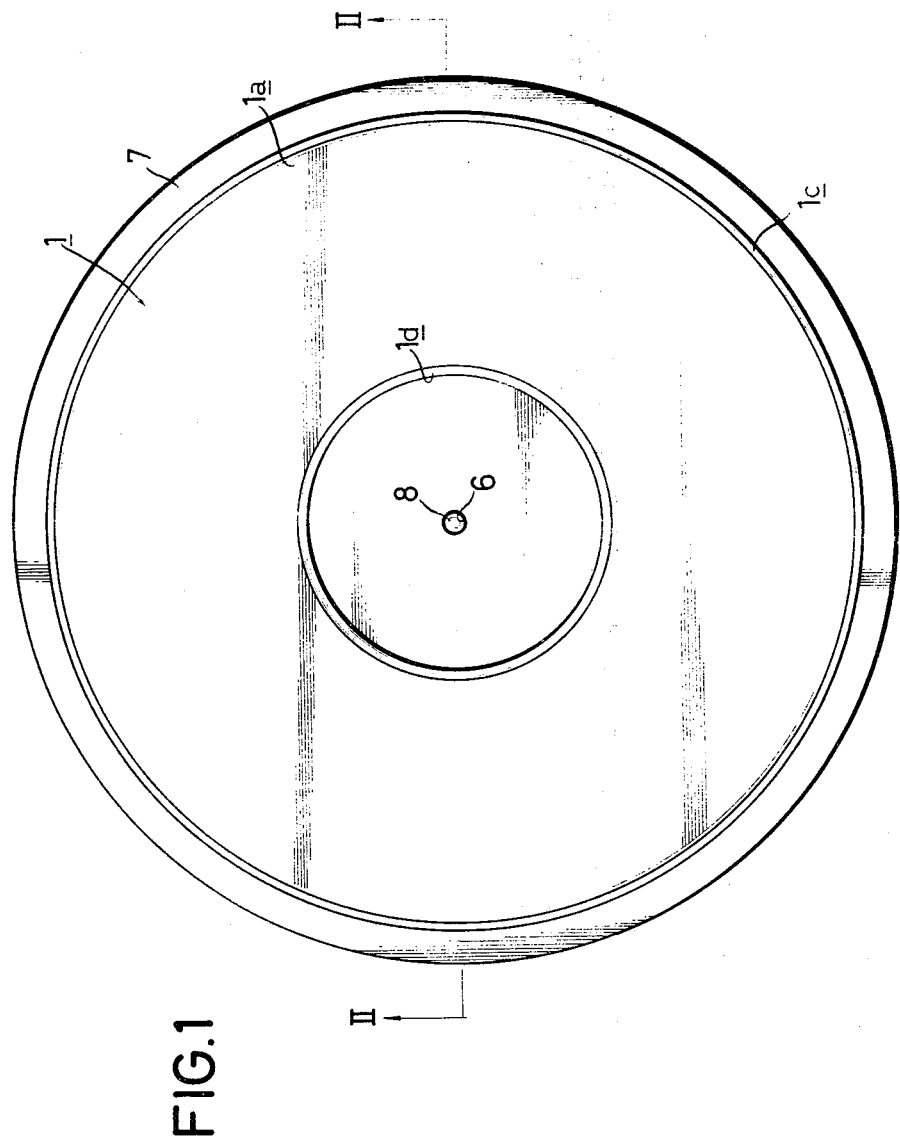
FIG. 1 is a top plan view of a mat according to an embodimet of this invention which is shown mounted on a phonograph record turntable.
Figure 2:
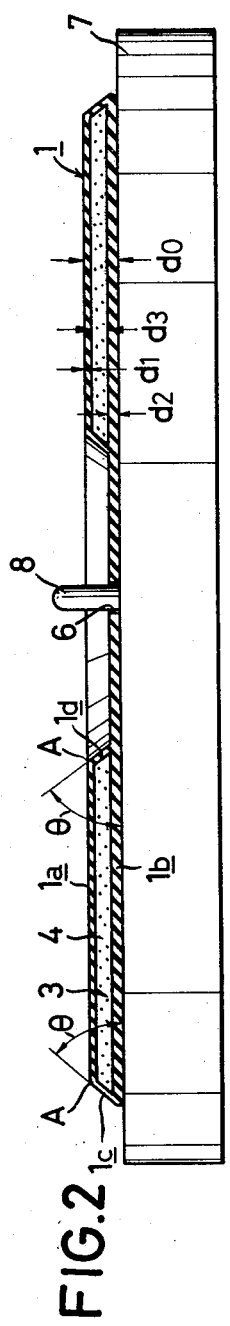
FIG. 2 is a sectional view taken along the line II—II on FIG. 1, but with the turntable being shown in elevation.
Figure 3:
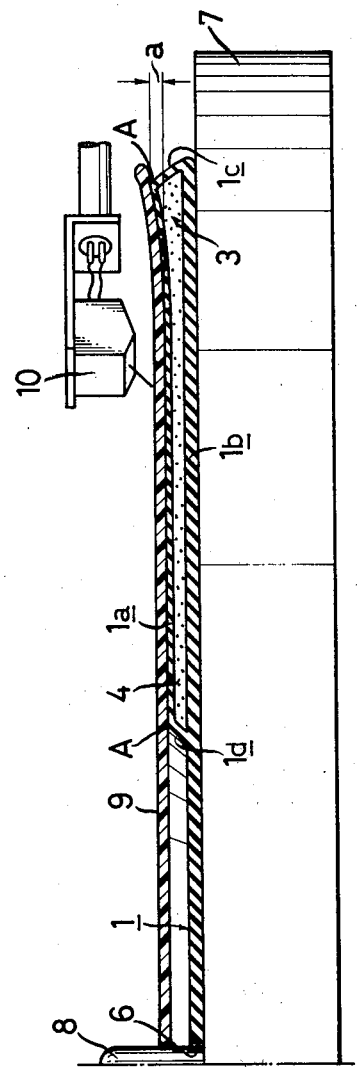
FIG. 3 is an enlarged, fragmentary sectional view corresponding to a portion of FIG. 2 and showing the manner in which the mat according to this invention fully conforms to, and supports the undersurface of a phonograph record placed thereon even though such record is substantially warped or distorted.

Referring to the drawings in detail, and initially to FIGS. 1, 2 and 3 thereof, it will be seen that a mat 1 according to the present invention is generally circular and provided with a central hole 6 so that, when mat 1 is placed or adhered on the surface of a rotary turntable 7 of a record player, the uusual spindle 8 projecting upwardly at the center of the turntable may extend through hole 6. The mat 1 is formed of a flexible, preferably elastic material such as, for example, natural or synthetic rubber or relatively thin plastic sheet material, and comprises at least one flexible enclosure of generally annular substantial flat configuration which defines at least one sealed interior space 3 (FIG. 2). In the embodiment shown on FIGS. 1, 2 and 3, the mat 1 is made up of an upper annular wall or sheet 1a having a radial extent that is at least coextensive with the portion of a standard phonograph record 9 that is provided with a record groove, and a circular lower wall or sheet 1b to which the outer and inner peripheral edge portions 1c and 1d, respectively of upper wall 1a are suitably secured, for example, as by vulcanizing in the case of the mat 1 being formed of rubber. Thus, upper wall 1a, its edge portions 1c and 1d, and the portion of lower wall 1b over which upper wall 1a is superposed cooperate to define a single annular sealed space 3 which, in accordance with this ivnention, is filled with a body 4 of fluid material which is preferably a viscous liquid having a viscosity in the range from approximately 3000cs to 10,000cs, and preferably in the range between approximtely 7000cs and 8000cs. A preferred viscous liquid to be contained in space 3 is silicon oil, however, other viscous liquids such as, for exale, liquid polyethylene-glycol, liquid polypropylene-glycol, liquid epoxy resin, liquid paraffin, liquid polyvinyl alcohol or the like may be employed.

Preferably, as shown particularly on FIG. 2, the upper wall 1a defining space 3 is formed so as to be normally flat, while the outer and inner edge portions 1c and 1d are formed to include acute angles $\theta$ with the lower wall 1b therebetween, that is, such edge potions 1c and 1d slope inwardly toward upper wall 1a therebetween. In a particular example of the mat 1 formed of rubber and having a diameter of 290mm, the thicknesses $d_1$ and $d_2$ of the upper and lower walls 1a and 1b, respectively, are each approximately 0.5 to 1mm, the height $d_3$ of the interior space 3 is normally about 1 to 2mm, and the overall thickness $d_0$ of the mat at the portion thereof forming the flexible enclosure about the space 3 is aproximately 3mm.

As shown on FIG. 3, if the phonograph record 9 placed on mat 1 is warped or distorted, for example, has a portion of its outer periphery distorted upwardly by a distance $a$ from the plane of the remainder of the record, the upper wall or sheet $a$ of mat 1 and the viscous liquid 4 in sealed space 3 are suitably deformed by the weight of record 9 so that the undersurface of the record contacts the upper surface of upper wall 1a over the entire area of the latter. Accordingly, even though record 9 is warped, the entire portion thereof having the record groove therein is uniformly supported by mat 1 according to this invention and no gaps appear therebetween. Thus, when a conventional cartridge 10 has its stylus or needle pressed downwardly into the record groove during reproduction of the signal recorded therein, there are no unsupported or floating portions of the warped record that would be susceptible to vertical vibration at the resonance freqency of the record and accurate reproduction of the recorded signal is achieved. Furthermore, any vibrations transmitted to the turntable 7, for example, from the drive motor for the latter or as a result of impacts or shocks to which the cabinet of the record player may be subjected, are absorbed or damped by the viscous liquid 4 in space 3, so that such vibrations are not transmited to the record and thence to cartridge 10. Therefore, cartridge 10 picks up only the signals actually recorded in the groove of phonograh record 9 and accurate reproduction of such signals is ensured. It is further to be noted that the sloping arrangement of the edge portions 1c and 1d of upper wall 1a which define the outer and inner peripheral walls of annular space 3 ensures that such peripheral walls can be easily flexed downwardly when required to achieve uniform contact with the undersurface of a warped phonograph record placed on mat 1. Thus, in the case of a phonograph record having its outer peripheral portion warped upwardly, as on FIG. 3, the sloping arrangement of the inner edge portion 1d of upper wall 1a is easily deformed downwardly to permit full contact of upper wall 1a with the undersurface of the warped record, rather than contacting the latter primarily at the inner edge of wall 1a, as indicated at A on FIG. 2.

Although the mat 1 of FIBS. 1, 2 and 3 has been described above as being formed of a cicular lower wall or sheet 1b and an annular upper wall or sheet 1a which is joined at its outer and inner edge portions to the lower wall for defining the sealed interior space 3, it is apparent that the mat 1 may be formed of substantially coextensive circular upper and lower walls or sheets which are secured to each other, as by vulcanizing, at their outer peripheral edges and over the entire circular central area of the mat 1, so as to again provide a sealed annular interior space between the portions of such upper and lower walls which are free of each other.

Figure 4:
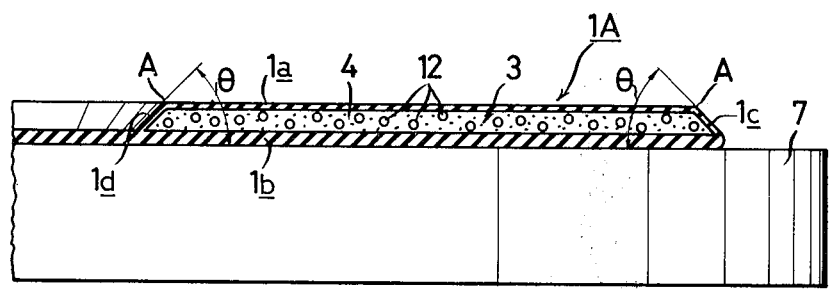
FIGS. 4, 5 and 6 are sectional views similar to that of FIG. 3, but showing phonograph record turntable mats according to other embodiments of this invention.

Referring now to FIG. 4, it will be seen that, in a mat 1A according to another embodiment of this invention which is otherwise similar to the previously described mat 1 and has its corresponding parts identified by the same reference numerals, small solid particles 12, for exaple, constituted by small glass beads, a powdered material, or the like, are also contained in space 3 so as to float within the viscous liquid 4. Preferably, the solid particles 12 floating in the viscous liquid 4 are of a spacific gravity substantially equal to that of the viscous liquid so that the solid particles will remain uniformly dispersed within the viscous liquid. When vibrations are transmitted to the mat 1A, for example, from the turntable 7 thereunder, there is frictional resistance to the movement of the viscous liquid 4 relative to the solid particles 12 floating therein, and such frictional resistance enhances the vibration-damping properties of the mat 1A.

Figure 5:
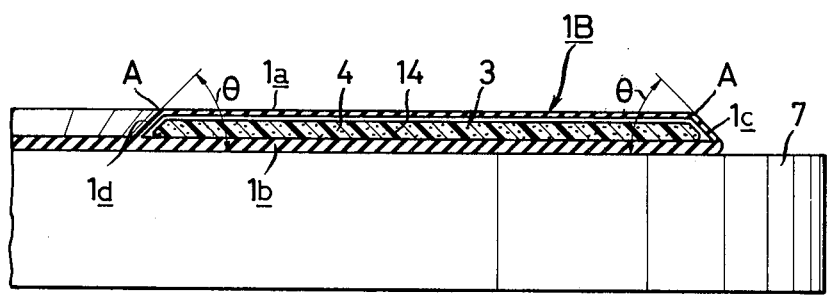

It will be apparent that when the mat 1 or 1A as described above is placed or mounted on a turntable 7 which is not absolutely horizontal, the viscous liquid 4 in the single annular space 3 will tend to flow into the portion of the space 3 which is lowermost with the result that the surface of upper wall 1a of the mat will not be parallel to the surface of turntable 7 when the latter is at rest. Thereafter, when a phonograph record is placed on the mat 1 or 1A and the turntable 7 is rotated for a reproducing operation, the record will undergo a wobbling movement relative to the turntable even if the record itself is absolutely flat. Referring now to FIG. 5, it will be seen that the foregoing problem can be avoided in a mat 1B according to another embodiment of this invention which is otherwise similar to the mat 1 and has its corresponding parts identified by the same reference numerals, by providing absorbent material 14 within the space 3 which is capable of absorbing or taking up the viscous liquid 4 in such space. The absorbent material 14 may have a sheet-like configuration and be formed of a natural or synthetic sponge material or a fibrous material, such as, carbon fibers, which is capable of absorbing or taking up he viscous liquid. In the case of the mat 1B according to this invention, the viscous liquid is substantially uniformly retained throughout the space 3 by the absorbent material 14 even if turntable 7 is not horizontally disposed. Of course, the absorbent material 14 has to be easily compressible so that it will not interfere with the deformation of upper wall 1a when a warped record is placed on the mat.

Figure 6:
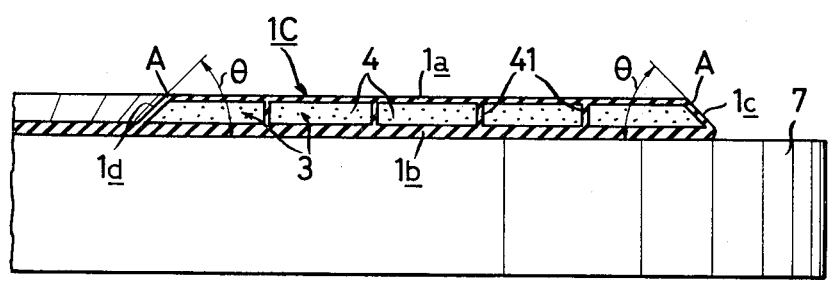

In each of the above described embodiments of the invention, a single annular space 3 has been provided between the portions of upper and lower walls 1a and 1b which are free of each other. However, as shown on FIG. 6, a mat 1C according to this invention may be provided with spaced apart partitions 41 extending between upper and lower walls 1a and 1b so as to provide a plurality of spaces 3 which contain the viscous liquid 4. Of course, each of the spaces 3 on FIG. 6 may also contain particles floating in the viscous liquid, as at 12 on FIG. 4, or an absorbent material, as at 14 on FIG. 5. The partitions 41 may extend circumferentially and be radially spaced from each other, as shown on FIG. 6, or such partitions may extend radially and be angularly spaced from each other. Furthermore, a mat according to this invention having a configuration similar to that illustrated on FIG. 6 may be defined by a plurality of concentric circular tube-like members of flexibly elastic material each filled with a viscous liquid and being suitably joined to each other in a nested relationship. Alternatively, a mat similar to that shown on FIG. 6 may be provided by a spiral tube of flexibly elastic material which is filled with a viscous liquid and disposed on the turntable 7.

Although specific embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A mat for a phonograph record turntable comprising: at least one flexible enclosure defining at least one sealed interior space and adapted to be disposed on a turntable, a fluid material disposed in said space so that said flexible enclosure provides a cushioned, vibration-damping support surface for a phonograph record which conforms to the shape of the latter, said space further containing particles floating in said fluid material.

2. A mat according to claim 1 in which said fluid material and said particles have substantially the same specific gravity so that said particles will be substantially uniformly dispersed within said fluid material.

3. A mat according to claim 1 in which said fluid material is a viscous liquid.

4. A mat according to claim 3 in which said viscous liquid is a silicon oil.

5. A mat according to claim 1 in which said flexible enclosure includes upper and lower superposed walls having edge portions which are secured together to define said sealed interior space therebetween.

6. A mat according to claim 5 in which at least one of said edge portions slopes inwardly toward said upper wall.

7. A mat according to claim 5 in which said edge portions extend generally cicumferentialy at the radially inner and outer sides of said flexible enclosure, and said edge portions slope inwardly toward said upper wall at both said inner and outer sides of the enclosure.

8. A mat for a phonograph record turntable comprising: at least one flexible enclosure defining at least one sealed interior space and adapted to be disposed on a turntable, and a fluid material disposed in said space so that said flexible enclosure provides a cushioned, vibration-damping support surface for a phonograph record which conforms to the shape of the latter, said space further containing an absorbent material which takes up said fluid material.

9. A mat according to claim 8 in which said absorbent material is in the form of a sheet.

10. A mat according to claim 8 in which said absorbent material is spong-like.

11. A mat according to claim 8 in which said absorbent material is fibrous.

12. A mat according to claim 8 in which said flexible enclosure includes upper and lower superposed walls having edge portions which are secured together to define said sealed interior space therebetween.

13. A mat according to claim 12 in which at least one of said edge portions slopes inwardly toward said upper wall.

14. A mat according to claim 12 in which said edge portions extend generally circumferentially at the radially inner and outer sides of said flexible enclosure, and said edge portions slope inwardly toward said upper wall at both said inner and outer sides of the enclosure.

15. A mat according to claim 8 in which said fluid material is a viscous liquid.

16. A mat according to claim 15 in which said viscous liquid is silicon oil.

* * * * *